United States Patent
Chang et al.

(10) Patent No.: US 9,413,567 B1
(45) Date of Patent: Aug. 9, 2016

(54) SYSTEMS AND METHODS FOR FINITE IMPULSE RESPONSE ADAPTATION FOR GAIN AND PHASE CONTROL

(71) Applicant: Marvell International Ltd., Hamilton (BM)

(72) Inventors: Yu-Yao Chang, Sunnyvale, CA (US); Jun Gao, Sunnyvale, CA (US); Gregory Burd, San Jose, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 129 days.

(21) Appl. No.: 14/301,457

(22) Filed: Jun. 11, 2014

Related U.S. Application Data

(63) Continuation of application No. 13/525,862, filed on Jun. 18, 2012.

(60) Provisional application No. 61/507,524, filed on Jul. 13, 2011.

(51) Int. Cl.
| | |
|---|---|
| *H04B 3/32* | (2006.01) |
| *H04L 25/03* | (2006.01) |
| *H04N 5/14* | (2006.01) |
| *H04B 3/14* | (2006.01) |

(52) U.S. Cl.
CPC ............ *H04L 25/03159* (2013.01); *H04N 5/14* (2013.01); *H04B 3/145* (2013.01); *H04B 3/32* (2013.01)

(58) Field of Classification Search
USPC .......... 320/103, 104, 105, 116; 324/225, 226, 324/625, 623, 626, 76.11, 76.12
See application file for complete search history.

(56) References Cited

U.S. PATENT DOCUMENTS

| | | | |
|---|---|---|---|
| 4,757,519 A | 7/1988 | Collison et al. |
| 5,243,624 A | 9/1993 | Paik et al. |
| 5,512,959 A | 4/1996 | D'Alto et al. |
| 5,825,318 A | 10/1998 | Patapoutian et al. |
| 5,995,545 A | 11/1999 | Ueno |
| 5,999,355 A | 12/1999 | Behrens et al. |
| 6,208,481 B1 | 3/2001 | Spurbeck et al. |
| 6,249,398 B1 | 6/2001 | Fisher et al. |
| 6,272,173 B1 | 8/2001 | Hatamian |
| 6,381,085 B1 | 4/2002 | Du et al. |
| 6,389,069 B1 | 5/2002 | Mathe |
| 6,449,110 B1 | 9/2002 | DeGroat et al. |
| 6,477,200 B1 | 11/2002 | Agazzi et al. |
| 6,513,141 B1 | 1/2003 | Livingston |
| 6,526,105 B1 | 2/2003 | Harikumar et al. |
| 6,804,695 B1 | 10/2004 | Hsu |

(Continued)

FOREIGN PATENT DOCUMENTS

WO     01/78339 A1     3/2001

*Primary Examiner* — Edward Tso
*Assistant Examiner* — Alexis A Boateng

(57) ABSTRACT

System and methods are provided for signal processing. For example, an input signal is received at a finite impulse response filter circuit including a plurality of stages, where each stage of the plurality of stages is associated with a sample value of the input signal and a stage weight. An output signal is generated using the finite impulse response filter circuit, the output signal being equal to a weighted sum of the sample values of the input signal. An error signal is generated to indicate a difference between the output signal and a target. A constraint is applied to one or more of the stage weights. The stage weights are changed within the constraint to reduce a magnitude of the error signal.

20 Claims, 6 Drawing Sheets

(56) References Cited

U.S. PATENT DOCUMENTS

| | | |
|---|---|---|
| 6,819,514 B1 | 11/2004 | Behrens et al. |
| 6,829,296 B1 | 12/2004 | Troulis et al. |
| 6,980,592 B1 | 12/2005 | Rambaud et al. |
| 7,012,772 B1 | 3/2006 | Vis |
| 2003/0052805 A1 | 3/2003 | Troy et al. |
| 2003/0112861 A1 | 6/2003 | Erdogan et al. |
| 2003/0174783 A1 | 9/2003 | Rahman et al. |
| 2004/0013190 A1 | 1/2004 | Jayaraman et al. |
| 2005/0041760 A1 | 2/2005 | Yousef |

SYSTEMS AND METHODS FOR FINITE IMPULSE RESPONSE ADAPTATION FOR GAIN AND PHASE CONTROL

CROSS-REFERENCE TO RELATED APPLICATIONS

This application is a continuation of U.S. patent application Ser. No. 13/525,862, filed on Jun. 18, 2012, which claims priority to and benefit from U.S. Provisional Patent Application No. 61/507,524, filed on Jul. 13, 2011, entitled "FIR Adaptation for Gain and Timing Phase Control," the entirety of which is incorporated herein by reference.

Additionally, this application is related to U.S. patent application Ser. No. 10/788,998, filed Feb. 27, 2004, now U.S. Pat. No. 7,505,537, the entirety of which is incorporated herein by reference.

FIELD

The technology described in this patent document relates generally to data processing, and more particularly to finite impulse response adaptation for data processing.

BACKGROUND

Finite impulse response (FIR) filters are widely used in various signal processing devices/circuits, such as read circuits for disk drives, Ethernet transceivers, communication devices, speech processing devices, adaptive noise cancellation devices, to filter an input signal to obtain an output signal with desired characteristics.

FIG. 1 illustrates a conventional FIR filter. The FIR filter 100 includes N−1 delay components, $102_1, 102_2, \ldots, 102_{N-1}$, N multipliers, $104_1, 104_2, \ldots, 104_N$, and N−1 adders, $106_1, 106_2, \ldots, 106_{N-1}$, where N is an integer. The N multipliers are associated with N coefficients (e.g., stage weights), $C_0, C_1, \ldots, C_{N-1}$, respectively. In operation, the FIR filter 100 receives an input signal x[k] 101, and generates an output signal y[k] 108, as follows:

$$y[k] = \sum_{i=0}^{N-1} C_i \times x[k-i] \quad (1)$$

SUMMARY

In accordance with the teachings described herein, systems and methods are provided for signal processing. In one embodiment, a method is provided for signal processing using a finite impulse response filter circuit. An input signal is received at a finite impulse response filter circuit including a plurality of stages, where each stage of the plurality of stages is associated with a sample value of the input signal and a stage weight. An output signal is generated using the finite impulse response filter circuit, the output signal being equal to a weighted sum of the sample values of the input signal. An error signal is generated to indicate a difference between the output signal and a target. A constraint is applied to one or more of the stage weights. The plurality of stage weights are changed within the constraint to reduce a magnitude of the error signal.

In another embodiment, a system for signal processing includes a finite impulse response filter circuit and an adaptation component. The finite impulse response filter circuit includes a plurality of stages for filtering an input signal to generate an output signal, where each stage of the plurality of stages is associated with a sample value of the input signal and a stage weight, the output signal being equal to a weighted sum of the sample values of the input signal. The adaptation component configured to receive the error signal indicating a difference between the output signal and the target, apply a constraint to one or more of the stage weights, and change the stage weights within the constraint to reduce a magnitude of the error signal.

In yet another embodiment, an integrated circuit for signal processing includes a finite impulse response filter circuit and an adaptation circuit. The finite impulse response filter includes a plurality of stages for filtering an input signal to generate an output signal, where each stage of the plurality of stages is associated with a sample value of the input signal and a stage weight, the output signal being equal to a weighted sum of the sample values of the input signal. The adaptation circuit is configured to receive an error signal indicating a difference between the output signal and a target, apply a constraint to one or more of the plurality of stage weights, and change the stage weights within the constraint to reduce a magnitude of the error signal.

DETAILED DESCRIPTION

In signal processing systems, a FIR filter is often included in an adaptive equalizer. Usually, a feedback loop provides an error signal to the adaptive equalizer to indicate a difference between the equalizer output and a desired output. The parameters of the equalizer (e.g., stage weights of the FIR filter) may be adjusted to minimize the difference between the equalizer output and a desired output so as to achieve an optimal frequency response. However, a signal processing system often includes a gain control loop and/or a phase control loop which can interfere with the feedback loop of the equalizer, and thus prevent the equalizer from converging to an optimal frequency response. For example, an equalizer may have a global optimal frequency response. When the parameters of the equalizer are changed to increase the gain of the output in order to reach the global optimal frequency response, the gain control loop may actually operate to decrease the gain of the output. Such conflicts may lead to loss of resolution and failure of components. In addition, if the parameters of the equalizer have been changed too far to compete with the gain control loop/the phase control loop, the equalizer may drift into a local optimal frequency response which is less desirable than the global optimal frequency response. Proper constraints are to be imposed on the equalizer (e.g., the FIR filter) so that the equalizer will not drift into undesirable states as a result of competing with the gain control loop and/or the phase control loop. One possible approach is to make certain stage weights of the FIR filter that affect the gain/phase of the equalizer output most significantly unadaptable while other stage weights can be adapted. However, such a constraint encounters problems when the stages with unadaptable stage weights become less dominant than some stages with adaptable stage weights over time.

Figure 1:
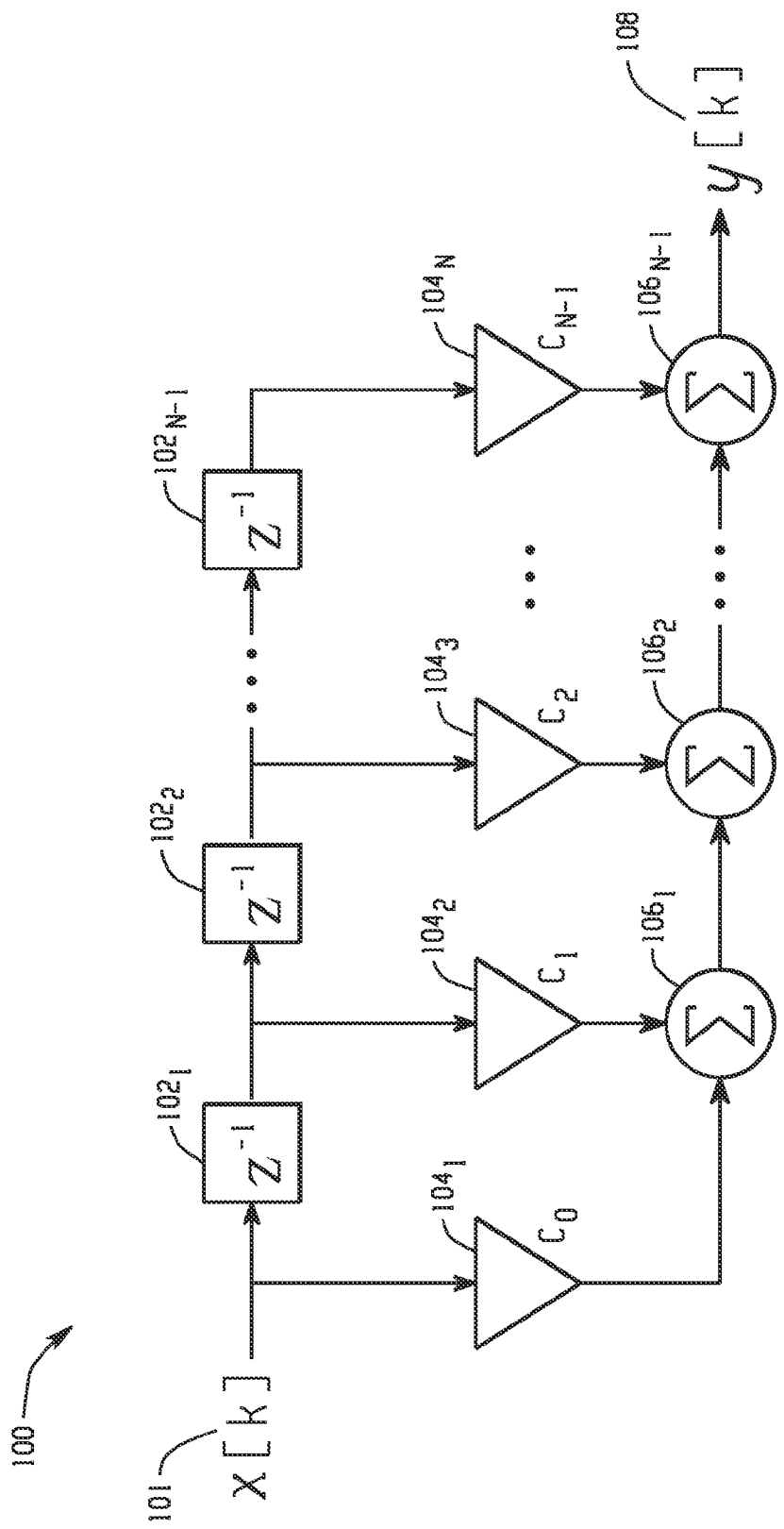
FIG. 1 illustrates a conventional FIR filter.
Figure 2:
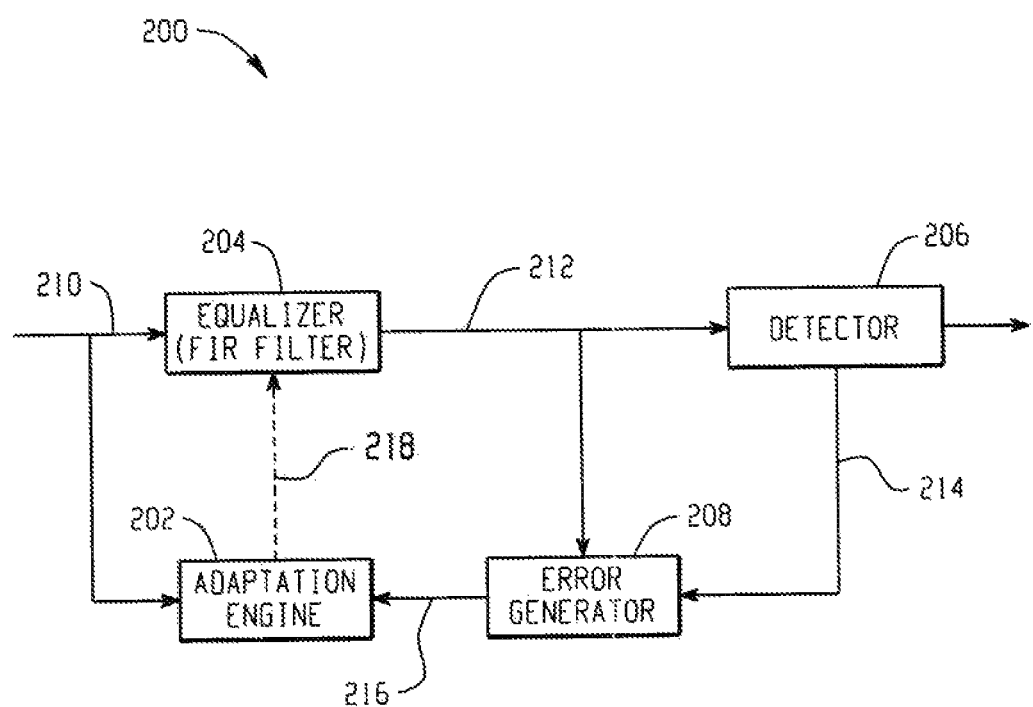
FIG. 2 illustrates an example signal processing system with an adaptation engine.

FIG. 2 illustrates an example signal processing system with an adaptation engine. The signal processing system 200 includes an adaptation engine 202, an equalizer 204, a detector 206, and an error generator 208. The adaptation engine 202 adjusts the parameters of the equalizer 204 using an output 218 in order to reduce the magnitude of an error signal 216 which indicates a difference between an output signal 212 of the equalizer 204 and a desired output (e.g., a reconstructed signal 214).

In operation, the equalizer 204 that includes a FIR filter processes an input signal 210 and generates the output signal 212 to the detector 206 and the error generator 208. The detector 206 detects the output signal 212 and outputs the reconstructed signal 214 to the error generator 208 which provides the error signal 216 to the adaptation engine 202 for adjusting the equalizer 204.

In one embodiment, the adaptation engine 202 adjusts the parameters of the equalizer 204 using a fixed-stage-weight approach. The adaptation engine 202 initially sets the stage weights of one or more stages in the FIR filter as unadaptable, and sets stage weights of other stages in the FIR filter as adaptable. For example, the adaptation engine 202 selects the stages that affect the gain/phase of the FIR filter most significantly and fixes the stage weights of the selected stages. If one or more predetermined conditions are satisfied, the adaptation engine 202 keeps the same stage weights fixed. If the one or more predetermined conditions are not satisfied during operation, the adaptation engine 202 selects a different set of stages and fixes the stage weights of the different set of stages instead, while adapting the rest of the stage weights in the FIR filter. For example, the one or more predetermined conditions are satisfied when changes of the adaptable stage weights are within a predetermined range. In another example, the one or more predetermined conditions are satisfied when the phase change of the FIR filter calculated based on the stage weights of the FIR filter is within a predetermined range.

In another embodiment, the adaptation engine 202 adjusts the parameters of the equalizer 204 using a fixed-frequency-response approach. The adaptation engine 202 applies a constraint to the stage weights of the FIR filter in order to fix the frequency response of the FIR filter at a particular frequency. The adaptation engine 202 then changes the stage weights of the FIR filter within the constraint. For example, the constraint may be applied using a constraint matrix. In another example, the particular frequency may be a preamble frequency or a normalized frequency of 0.25. The normalized frequency is determined by dividing a frequency to be normalized by a sample frequency of the signal processing system 200. The preamble frequency is related to a preamble field of a sector format overhead in a hard drive sector format design. The preamble field may include a known, periodic data pattern such as {1, 1, 0, 0}. A read circuit may rely on the known, periodic preamble pattern to establish a proper phase and gain for further data processing. The FIR frequency response of the known preamble pattern {1, 1, 0, 0} can be easily calculated. For example, the frequency response can be represented with two coefficients, such as C_cos and C_sin, where C_cos=($C_0$-$C_2$+$C_4$-$C_6$+ . . . ) and C_sin=($C_1$-$C_3$+$C_5$-$C_7$+ . . . ) Fixing the frequency response of the FIR filter at the preamble frequency may help stabilize the signal processing system 200.

The signal processing system 200 or one or more components of the signal processing system 200 (e.g., the adaptation engine 202) may be implemented or fabricated in any hardware device, such as a data processor, central processing unit, an integrated circuit or other chip, an application-specific integrated circuit, a field programmable gate array, hard-wired circuit components, or other devices for data processing.

Figure 3:
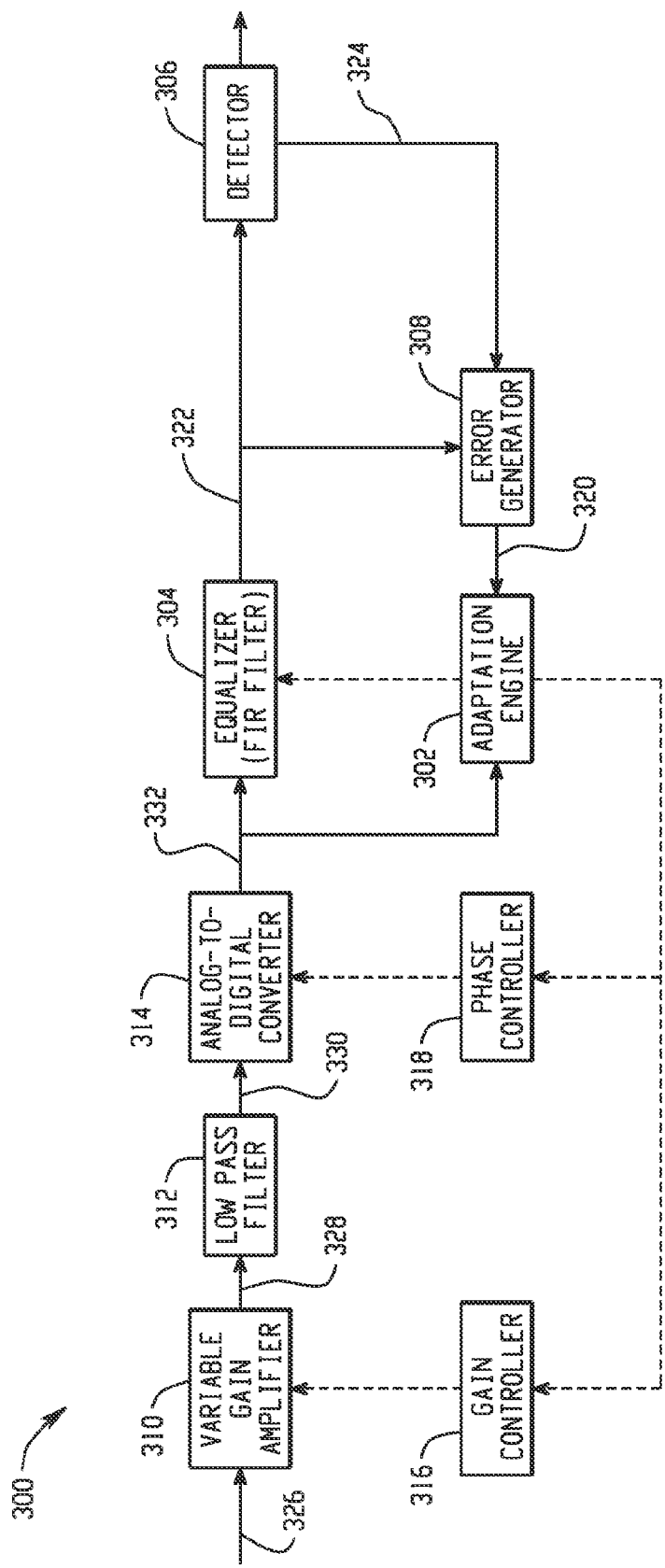
FIG. 3 illustrates another example signal processing system with an adaptation engine.

FIG. 3 illustrates another example signal processing system 300 with an adaptation engine 302. The adaptation engine 302 receives an error signal 320 that indicates a difference between an output signal 322 of an equalizer 304 and a reconstructed signal 324 generated by a detector 306. The adaptation engine 302 then uses the error signal 320 to adapt the equalizer 304 in order to reduce the magnitude of the error signal 320.

In operation, the variable gain amplifier 310 receives an input signal 326, and outputs an amplified signal 328 to the low pass filter 312 which generates a filtered signal 330. The analog-to-digital converter (ADC) samples the filtered signal 330 and outputs a digital signal 332 to the equalizer 304 that includes a FIR filter. The detector 306 detects the output signal 322 of the equalizer 304 and generates the reconstructed signal 324 to the error generator 308 which compares the output signal 322 and the reconstructed signal 324. The error signal 320 is used by the adaptation engine 302 to optimize the equalizer 304. In addition, the adaptation engine 302 may adjust the gain of the variable gain amplifier 310 through the gain controller 316 so that the variable gain amplifier 310 does not compete with the equalizer 304. Furthermore, the adaptation engine 302 may change the phase of the ADC 314 through the phase controller 318 so that the ADC 314 does not compete with the equalizer 304.

Specifically, for adapting the equalizer 304, the adaptation engine 302 may implement a least mean squares (LMS) algorithm which can be derived as follows. For example, a vector of the stage weights of a FIR filter that is included in the equalizer 304 can be represented as:

$$C(k) = [c_0 \, c_1 \ldots c_{N-1}]^T \quad (2)$$

where $C(k)$ represents a vector of stage weights at time k, and $c_0, c_1, \ldots, c_{N-1}$ represent stage weights. An error term at time k can be determined as follows:

$$e_k = y_k - \hat{y}_k \quad (3)$$

where $e_k$ represents the error term at time k, $y_k$ represents the output signal 322 at time k, and $\hat{y}_k$ represents the reconstructed signal 324 at time k. An input vector of the FIR filter can be represented as follows:

$$X(k) = [x_k \, x_{k-1} \ldots x_{k-N}]^T \quad (4)$$

where $X(k)$ represents the input vector at time k, and $x_k$ represents an input signal of the FIR filter at time k.

A cost function can be determined as follows:

$$E\{|e_k|^2\} = E\{|C(k)^T X(k) - \hat{y}_k|^2\} \quad (5)$$

where, $E\{|e_k|^2\}$ represents the cost function, and $X(k)$ represents an input vector of the FIR filter at time k. For example, $e_k$ and $x_k$ align in terms of user data.

The least mean squares (LMS) algorithm that may be used to update the stage weights of the FIR filter in the equalizer 304 is as follows:

$$C(k+1) = C(k) - \frac{\mu}{2} \cdot \nabla_{C(k)^T} E\{|e_k|^2\} = C(k) - \mu \cdot E\{e_k X(k)\} \quad (6)$$

where μ represents a programmable gain.

A simplified unconstrained LMS adaptation can be determined as:

$$C(k+1) = C(k) - \mu \cdot e_k X(k) \quad (7)$$

For simplification, $e_k=1$ if $(y_k - \hat{y}_k) >= 0$, otherwise $e_k = -1$.

When a linear constraint is applied to the stage weights of the FIR filter as follows:

$$BC(k) = BC(0) = \omega \quad (8)$$

where B is a constraint matrix and ω is a constant, the LMS can be modified as follows:

$$\tilde{C}(k+1) = C(k) - \mu \cdot e_k X(k) \quad (9)$$

$$C(k+1) = \tilde{C}(k+1) + \theta(K+1) \quad (10)$$

where a N×1 vector θ(k+1) is chosen such that BC(k+1)=BC(k)=ω and $\theta^T(K+1)\theta(k+1)$ is minimized.

The optimal solution of θ(K+1) can be determined using a method of Lagrange multiplier by minimizing the cost function:

$$J = \theta^T(K+1)\theta(K+1) - 2\lambda^T[BC(K+1) - \omega] \quad (11)$$
$$= \theta^T(K+1)\theta(K+1) - 2\lambda^T[BC(K) - B\mu e_k X(k) + B\theta(k+1) - \omega]$$
$$= \theta^T(K+1)\theta(K+1) - 2\lambda^T[-B\mu e_k X(k) + B\theta(k+1)]$$

where λ is a N×1 vector of Lagrange multiplier.

Assuming $$\frac{\partial J}{\partial \theta^T(k+1)} = 2\theta(k+1) - 2B^T\lambda = 0,$$

then $\theta(k+1)_{opt} = B^T \lambda$. Consequently, the Lagrange cost function can be expressed as:

$$J_{\theta(k+1)opt} = -\lambda^T BB^T \lambda + 2\lambda^T B\mu e_k X(k) \quad (12)$$

Assuming $$\frac{dJ_{\theta(k+1)opt}}{d\lambda^T} = -2BB^T\lambda + 2B\mu e_k X(k) = 0,$$

then $\lambda = \mu e_k (BB^T)^{-1} BX(k)$. Thus, $$\theta(k+1)_{opt} = \mu e_k B^T (BB^T)^{-1} BX(k) \quad (13)$$

A generic equation for the linear constrained LMS is given as follows:

$$C(k+1) = C(k) - \mu \cdot e_k X(k) + \mu e_k B^T (BB^T)^{-1} BX(k) \quad (14)$$
$$= C(k) + \mu \cdot e_k (-I + B^\# B) X(k)$$

where $B^\# = B^T (BB^T)^{-1}$.

Any constrained LMS can be implemented by designing a proper transform matrix $$M = (-I + B^\# B) \quad (15)$$

As an example, the FIR filter included in the equalizer 304 has ten stages where each stage has a stage weight. In one embodiment, the adaptation engine 302 may adapt the stage weights of the FIR filter in the equalizer 304 using a fixed-stage-weight approach. The adaptation engine 302 may initially select two stages, e.g., a fourth stage and a fifth stage, and set the stage weights of these two stages as unadaptable. During operation, the adaptation engine 302 may keep the same stage weights fixed if one or more predetermined conditions are satisfied. If the predetermined conditions are not satisfied, the adaptation engine 302 selects a different set of stages, e.g., the fifth stage and a sixth stage, and sets the corresponding stage weights as unadaptable. For example, an LMS algorithm for keeping the fourth stage and the fifth stage unadaptable is as follows:

$$C(k+1) = C(k) - \mu \cdot e_k X(k) + \mu \cdot e_k \left( \begin{bmatrix} 0_{3\times 1} \\ x_{k-3} \\ x_{k-4} \\ 0_{5\times 1} \end{bmatrix} \right) \quad (16)$$

It corresponds to a constraint matrix $$B = \begin{bmatrix} 0 & 0 & 0 & 1 & 0 & 0 & 0 & 0 & 0 & 0 \\ 0 & 0 & 0 & 0 & 1 & 0 & 0 & 0 & 0 & 0 \end{bmatrix}.$$

Further, the LMS algorithm for keeping the fifth stage and the sixth stage unadaptable is as follows:

$$C(k+1) = C(k) - \mu \cdot e_k X(k) + \mu \cdot e_k \left( \begin{bmatrix} 0_{4\times 1} \\ x_{k-4} \\ x_{k-5} \\ 0_{4\times 1} \end{bmatrix} \right) \quad (17)$$

It corresponds to a constraint matrix $$B = \begin{bmatrix} 0 & 0 & 0 & 0 & 0 & 1 & 0 & 0 & 0 & 0 \\ 0 & 0 & 0 & 0 & 1 & 0 & 0 & 0 & 0 & 0 \end{bmatrix}.$$

For example, when the adaptation engine 302 changes the adaptable stage weights during operation in order to achieve optimal frequency response, the predetermined conditions are satisfied if changes of stage weights are within a predetermined range or if the phase change of the equalizer 304 is within a predetermined range. When the number of stage weights of which the changes exceed the predetermined range is below a threshold, the adaptation engine 302 may simply discard such changes and continue to operate without selecting a different set of stages to be fixed. When the number of stage weights of which the changes exceed the predetermined range is above the threshold, the adaptation engine 302 may select a different set of stages and sets the stage weights of the newly selected stages as unadaptable.

The adaptation engine 302 may monitor the phase change of the equalizer 304 and switch to a different set of unadaptable stage weights when the phase change of the equalizer 304 exceeds a threshold. As an example, at a time k, $$P_{4T}(k) = \arctan(C_o(k)/C_e(k))$$

$$|P_{4T}(k) - P_{4T\_ref}| < \text{Phase4TDrift\_Bound} \quad (18)$$

where $P_{4T}(k)$ represents a phase change at the 4T frequency, $C_o(k)$ represents a sine component of the FIR filter at the 2T frequency, and $C_e(k)$ represents a cosine component of the FIR filter at the 2T frequency. In addition, $P_{4T\_ref}$ represents a reference phase at a frequency 1/(4T), and Phase4TDrift_Bound represents the bound for phase change at the 4T frequency. For example, if the adaptation engine 302 switches to a different set of unadaptable stage weights, $P_{4T\_ref}$ may be set to $P_{4T}(k)$. Further, the adaptation engine 302 may not switch to a different set of unadaptable stage weights, even though the predetermined conditions are violated, until a predetermined time period has passed since the last switching.

In another embodiment, the adaptation engine 302 may adapt the FIR filter in the equalizer 304 using a fixed-frequency-response approach. For example, the adaptation engine 302 selects a constraint matrix $$B = \begin{bmatrix} 1 & 0 & -1 & 0 & 1 & 0 & -1 & 0 & 1 & 0 \\ 0 & 1 & 0 & -1 & 0 & 1 & 0 & -1 & 0 & 1 \end{bmatrix}$$

to prevent changes in a cosine component and a sine component of the FIR filter at the 2T frequency during the adaptation of stage weights of the FIR filter. The cosine component and the sine component of the FIR filter at the 2T frequency can be determined as follows:

$$c_e(k) = c_0 - c_2 + c_4 - c_6 + c_8 = c_e(0)$$

$$c_o(k) = c_1 - c_3 + c_5 - c_7 + c_9 = c_o(0) \quad (19)$$

Where $c_o(k)$ represents a sine component of the FIR filter at the 2T frequency, and $c_o(k)$ represents a cosine component of the FIR filter at the 2T frequency. Thus, the magnitude and phase of the FIR filter at the 2T frequency do not change during the adaptation of stage weights. Based on the constraint matrix, the following equation can be obtained:

$$B^\# B = 0.2 * \begin{bmatrix} B \\ -B \\ B \\ -B \\ B \end{bmatrix} \quad (20)$$

If a function $\Phi(k)$ is defined as follows:

$$\Phi(k) \equiv BX(k) \equiv \begin{bmatrix} \phi_k \\ \phi_{k-1} \end{bmatrix} = \begin{bmatrix} x_k - x_{k-2} + x_{k-4} - x_{k-6} + x_{k-8} \\ x_{k-1} - x_{k-3} + x_{k-5} - x_{k-7} + x_{k-9} \end{bmatrix} \quad (21)$$

then, the LMS algorithm for the fixed-frequency-response approach is determined as:

$$C(k+1) = C(k) - \mu \cdot e_k X(k) + \mu \cdot e_k B^\# BX(k) = \quad (22)$$

$$C(k) - \mu \cdot e_k X(k) + \frac{\mu}{5} \cdot e_k \begin{bmatrix} \Phi(k) \\ -\Phi(k) \\ \Phi(k) \\ -\Phi(k) \\ \Phi(k) \end{bmatrix}$$

A simplified form of the LMS algorithm for the fixed-frequency-response approach is as follows:

$$C(k+1) = C(k) - \mu' \cdot e_k 5X(k) + \mu' \cdot e_k \begin{bmatrix} \Phi(k) \\ -\Phi(k) \\ \Phi(k) \\ -\Phi(k) \\ \Phi(k) \end{bmatrix} \quad (23)$$

where $$\mu' \approx \frac{\mu}{5}.$$

Figure 4:
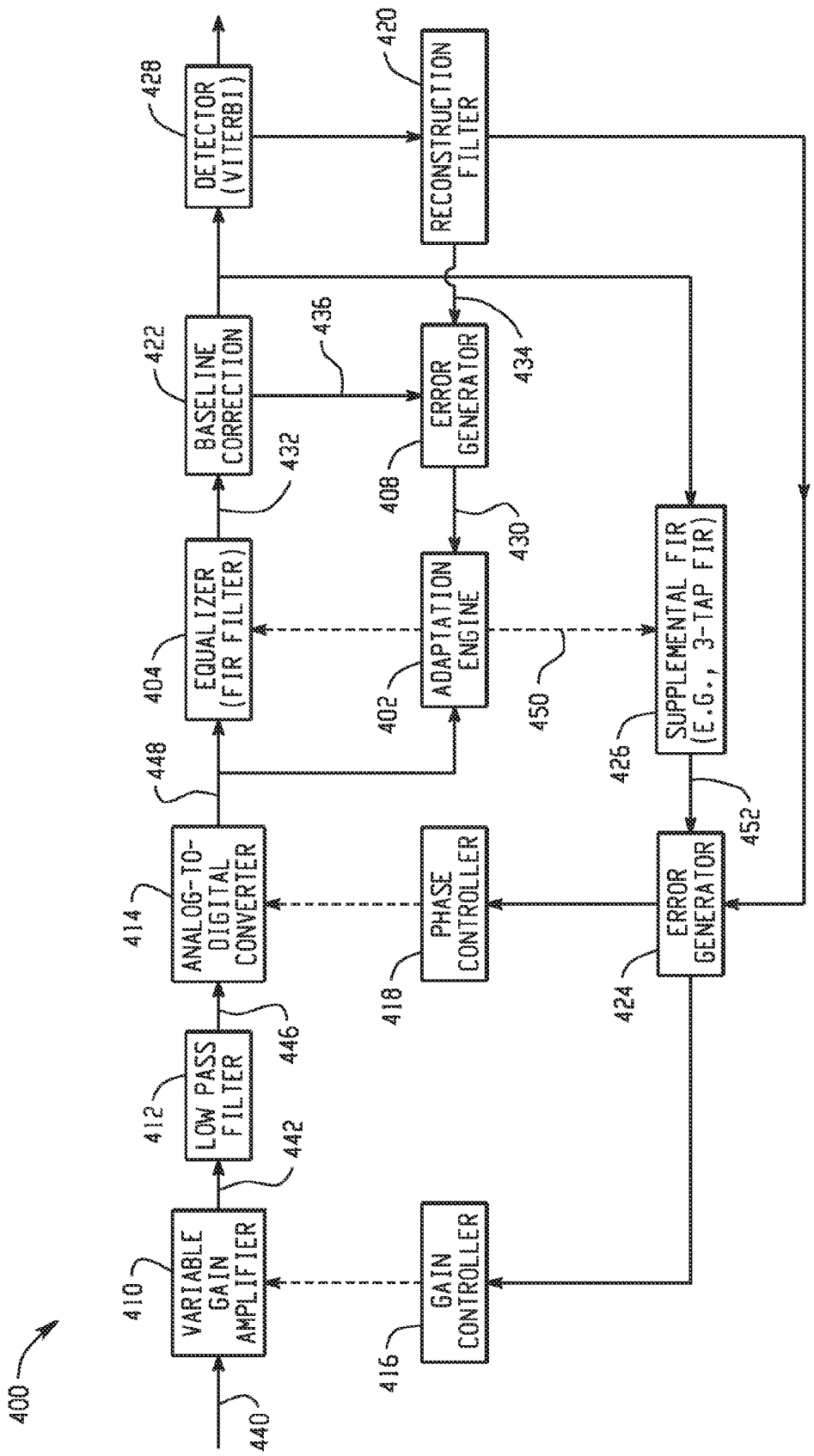
FIG. 4 illustrates another example signal processing system with an adaptation engine.

FIG. 4 illustrates another example signal processing system with an adaptation engine. The signal processing system 400 implements a supplemental FIR filter 426 (e.g., a 3-tap FIR) to adjust a variable gain amplifier 410 and an ADC 414 so that the variable gain amplifier 410 and the ADC 414 do not compete with an adaptation engine 402.

In operation, the variable gain amplifier 410 receives an input signal 440, and outputs an amplified signal 442 to a low pass filter 412 which generates a filtered signal 446. The ADC 414 samples the filtered signal 446 and outputs a digital signal 448 to the equalizer 404 that includes a primary FIR filter. The equalizer 404 outputs an equalized signal 432 which is corrected by a baseline corrector 422 and detected by a detector 428. A reconstruction filter 420 provides a reconstructed signal 434 to an error generator 408 which compares a corrected signal 436 from the baseline corrector 422 and the reconstructed signal 434 and generates an error signal 430. The adaptation engine 402 adjusts the equalizer 404 to reduce the magnitude of the error signal 430. In addition, the adaptation engine 402 outputs a signal 450 to the supplemental FIR filter 426 which affects a gain controller 416 and a phase controller 418 so that the variable gain amplifier 410 and the ADC 414 do not compete with the equalizer 404.

In one embodiment, the primary FIR filter in the equalizer 404 dictates the gain and the phase of the output of the system 400, while the supplemental FIR filter affects the variable gain amplifier 410 and the ADC 414 so that the gain and/or the phase of the output 432 converge to the gain and phase dictated by the primary FIR filter. For example, the supplemental FIR filter 426 includes three stages which have adaptable stage weights (−a, 1+b, a) respectively, where "1+b" mainly affects the gain of the output 452 and "−a" and "a" mainly affect the phase of an output 452. The output 452 is received by an error generator 424. When the primary FIR filter in the equalizer 404 cannot operate to decrease the gain of the output 432 of the equalizer 404 because of certain imposed constraints, the adaptation engine 402 adjusts the supplemental FIR filter 426 so that the variable gain amplifier 410 can operate to decrease the gain of the output 432. For example, the second stage weight, 1+b, of the supplemental FIR filter 426 may become larger than 1 (i.e., b>0), and thus the amplitude of the output signal 452 is increased (e.g., to 1+b times of the original output signal 452). In response, the gain controller 416 detects a gain larger than needed and thus may affect the variable gain amplifier 410 to decrease the gain. Similarly, if the primary FIR filter cannot operate to change the phase of the output of the equalizer 404 because of certain imposed constraints, the adaptation engine 402 may adjust the stage weights of the supplemental FIR filter 426 so that the phase controller 418 can operate to change the phase.

For example, the amplitude and the phase of the output 432 of the equalizer 404 at the preamble frequency can be determined as follows:

$$A_{2T} = \sqrt{c_e^2 + c_o^2} \quad (24)$$

$$\theta_{2T} = \tan^{-1}(c_o/c_e) \quad (25)$$

where $A_{2T}$ represents the amplitude of the output signal 432 at the preamble frequency, $\theta_{2T}$ represents the phase of the output signal 432 at the preamble frequency, $c_o$ represents a sine component of the primary FIR filter in the equalizer 404 at the preamble frequency, and $c_e$ represents a cosine component of the primary FIR filter at the preamble frequency.

When $c_e$ and $c_o$ change, the amplitude and the phase of the output signal 432 change as follows:

$$\partial A_{2T} = \frac{\partial A_{2T}}{\partial c_e}\partial c_e + \frac{\partial A_{2T}}{\partial c_o}\partial c_o = \frac{1}{\sqrt{c_e^2 + c_o^2}}(c_e\partial c_e + c_o\partial c_o) \quad (26)$$

$$\partial \theta_{2T} = \frac{\partial \theta_{2T}}{\partial c_e}\partial c_e + \frac{\partial \theta_{2T}}{\partial c_o}\partial c_o = \frac{1}{1+\left(\frac{c_o}{c_e}\right)^2}\frac{c_o}{c_e^2}\partial c_e + \frac{1}{1+\left(\frac{c_o}{c_e}\right)^2}\frac{c_e}{c_e^2}\partial c_o \quad (27)$$

In summary, $$\partial A_{2T} \propto c_e \partial c_e + c_o \partial c_o$$

$$\partial \theta_{2T} \propto -c_o \partial c_e + c_e \partial c_o \quad (28)$$

As an example, the supplemental FIR filter 426 is a three-stage FIR filter which has stage weights as follows:

$$F_{3t} = (-a, 1+b, a)$$

$$b(k+1) = b(k) - \partial A_{2T}$$

$$a(k+1) = a(k) - \partial \theta_{2T} \quad (29)$$

$$\partial A_{2T} = A_{2T\_LMS} - A_{2T\_constrained\_LMS} \approx c_e \partial c_e + c_o \partial c_o$$

$$\partial \theta_{2T\_LMS} - \theta_{2T\_constrained\_LMS} \approx -c_o \partial c_e + c_e \partial c_o.$$

where $$\partial c_e = c_{e\_LMS} - c_{e\_constrained\_LMS}$$

$$\partial c_o = c_{o\_LMS} - c_{o\_constrained\_LMS}$$

The variable gain amplifier 410 and the ADC 414 may be affected by an error term $e = \hat{y} - F_{3tap}y$. Then, if the primary FIR filter in the equalizer 404 cannot operate to change the gain or the phase of the output 432 because of the imposed constraints, the supplemental FIR filter 426 would change its output 452 so that the variable gain amplifier 410 or the ADC 414 can be adjusted to change the gain or the phase of the output respectively.

It is noted that $C_{LMS}(k+1) - C_{Constrained\ LMS}(k+1) = \Delta$, where $\Delta = -\mu e_k B^\# BX(k)$. Thus, if the primary FIR filter in the equalizer 404 is adjusted using a fixed-stage-weight approach, then $$\partial c_e(k) = -\mu e_k \sum_{n=0}^{4} (-1)^n \text{FIR\_COEFF\_MASK}[2n] x_{k-2n} \quad (30)$$

$$\partial c_o(k) = -\mu e_k \sum_{n=0}^{4} (-1)^n \text{FIR\_COEFF\_MASK}[1+2n] x_{k-1-2n}$$

where FIR_COEFF_MASK is 1 for unadaptable stages and 0 for adaptable stages.

If the primary FIR filter in the equalizer 404 is adapted using a fixed-frequency-response approach, then $$\partial c_e(k) = -\mu e_k \phi_k$$

$$\partial c_o(k) = -\mu e_k \phi_{k-1} \quad (31)$$

As such, the supplemental FIR filter 426 may implement an algorithm as follows:

$$b(k+1) = b(k) + \mu e_k \cdot [c_e(k) \quad c_o(k)] \cdot \begin{bmatrix} r_{cos4T}(k) \\ r_{sin4T}(k) \end{bmatrix} \quad (32)$$

$$a(k+1) = a(k) - \mu e_k \cdot [c_e(k) \quad c_o(k)] \cdot \begin{bmatrix} -r_{sin4T}(k) \\ r_{cos4T}(k) \end{bmatrix}$$

where $r_{cos\ 4T}(k)$ and $r_{sin\ 4T}(k)$ are parameters related to particular constraints. If the primary FIR filter is adjusted using the fixed-stage-weight approach, then $$r_{cos4T}(k) = \sum_{n=0}^{4} (-1)^n \text{D\_FIR\_COEFF\_MASK}[2n] x_{k-2n} \quad (33)$$

$$r_{sin4T}(k) = \sum_{n=0}^{4} (-1)^n \text{D\_FIR\_COEFF\_MASK}[1+2n] x_{k-1-2n}$$

On the other hand, if the primary FIR filter is adapted using the fixed-frequency-response approach, then $$r_{cos\ 4T}(k) = \phi_k$$

$$r_{sin\ 4T}(k) = \phi_{k-1} \quad (34)$$

Figure 5:
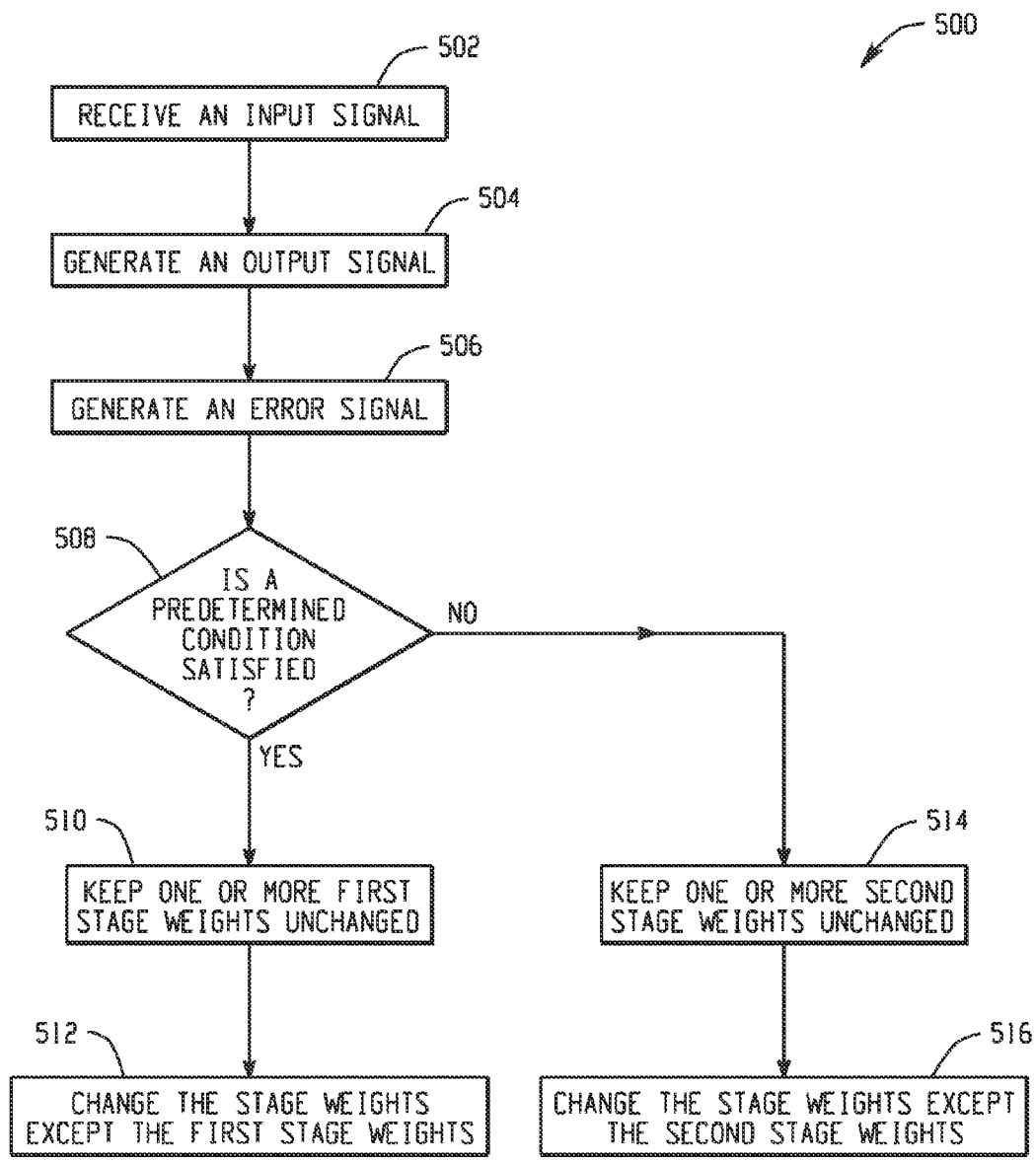
FIG. 5 illustrates an example flow diagram depicting a method for signal processing using a finite impulse response filter circuit.

FIG. 5 illustrates an example flow diagram 500 depicting a method for signal processing using a finite impulse response filter circuit. At 502, an input signal is received at a finite impulse response filter circuit. The finite impulse response filter circuit includes a plurality of stages, where each stage of the plurality of stages is associated with a sample value of the input signal and a stage weight. At 504, an output signal is generated using the finite impulse response filter circuit, the output signal being equal to a weighted sum of the sample values of the input signal. At 506, an error signal is generated that indicates a difference between the output signal and a target. At 508, a determination is made with respect to whether a predetermined condition is satisfied. At 510, when the predetermined condition is satisfied, one or more first stage weights among the stage weights are kept unchanged. Then, at 512, the stage weights, except the first stage weights, are changed to reduce a magnitude of the error signal. On the other hand, at 514, when the predetermined condition is not satisfied, the one or more second stage weights among the stage weights are kept unchanged, at least one second stage weight being different from the first stage weights. Then, at 516, the stage weights, except the second stage weights, are changed to reduce a magnitude of the error signal.

Figure 6:
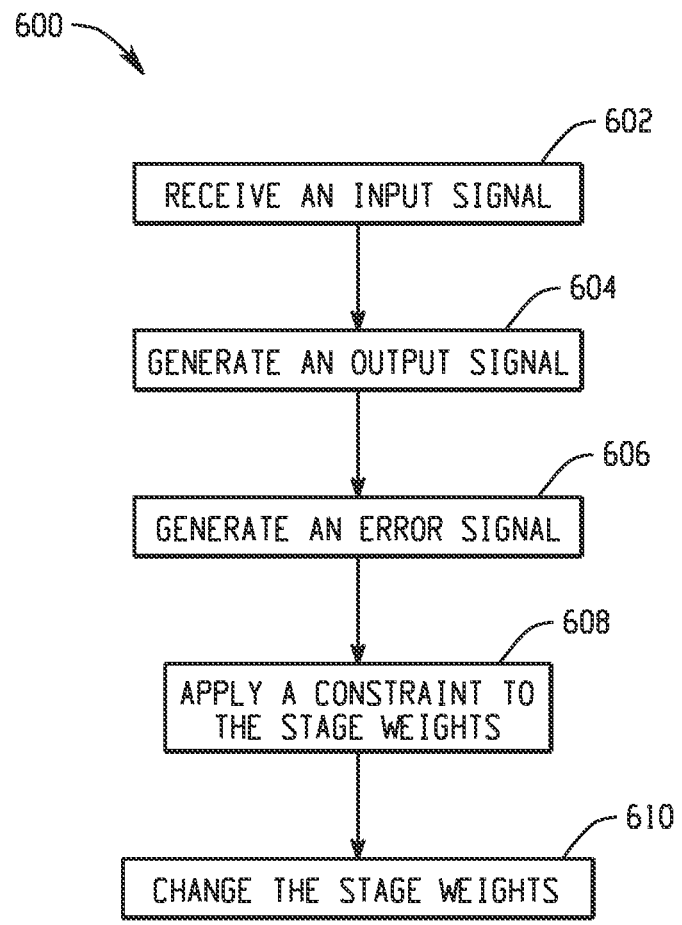
FIG. 6 illustrates another example flow diagram depicting a method for signal processing using a finite impulse response filter circuit.

FIG. 6 illustrates another example flow diagram depicting a method for signal processing using a finite impulse response filter circuit. At 602, an input signal is received at a finite impulse response filter circuit. The finite impulse response filter circuit includes a plurality of stages, where each stage of the plurality of stages is associated with a sample value of the input signal and a stage weight. At 604, an output signal is generated using the finite impulse response filter circuit, the output signal being equal to a weighted sum of the sample values of the input signal. At 606, an error signal is generated that indicates a difference between the output signal and a target. At 608, a constraint is applied to the stage weights to keep a frequency response of the finite impulse response circuit unchanged at a particular frequency. At 610, the stage weights are changed within the constraint to reduce a magnitude of the error signal.

This written description uses examples to disclose the invention, include the best mode, and also to enable a person skilled in the art to make and use the invention. The patentable scope of the invention may include other examples that occur to those skilled in the art.

For example, the systems and methods described herein may be implemented on many different types of processing devices by program code comprising program instructions that are executable by the device processing subsystem. Other implementations may also be used, however, such as firmware or even appropriately designed hardware configured to carry out the methods and systems described herein. In another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

It is claimed:

1. A method for signal processing by an equalizer having a plurality of stage weights, the method comprising:
   receiving an input signal;
   generating a plurality of sample values from the input signal;
   respectively multiplying each sample value of the plurality of sample values by a corresponding stage weight of the plurality of stage weights of the equalizer to yield a plurality of weighted sample values;
   summing the plurality of weighted sample values to yield an output signal;
   designating, based on a phase change of the equalizer, which of the plurality of stage weights are to be adjustable;
   determining an adjustment value for each of one or more of the adjustable stage weights;
   adjusting the one or more adjustable stage weights by the respective adjustment values; and
   repeating the multiplying and the summing to yield an adjusted output signal.

2. The method of claim 1, further comprising generating, from the output signal, a reconstructed signal, wherein the adjustment values are configured to reduce a difference between the output signal and the reconstructed signal.

3. The method of claim 1, wherein the adjustment values are configured to optimize frequency response of the equalizer.

4. The method of claim 3, wherein the adjustment values are configured to optimize global frequency response of the output signal at the expense of local frequency response of the equalizer.

5. The method of claim 1, further comprising:
   calculating the phase change as a function of values of the plurality of stage weights.

6. The method of claim 1, further comprising:
   in response to determining that the adjustment values do not satisfy a predetermined condition:
      refraining from adjusting the adjustable stage weights;
      designating different stage weights, of the plurality of stage weights, as adjustable;
      determining adjustment values for one or more of the different stage weights; and
      adjusting each of the one or more different stage weights by the respective adjustment value.

7. The method of claim 6, wherein the determining that the adjustment values do not satisfy the predetermined condition comprises determining that a number of the stage weights that exceed a predetermined range exceeds a threshold number.

8. The method of claim 6, wherein the determining that the adjustment values do not satisfy the predetermined condition comprises determining that the adjustment values, if applied to the adjustable phase stages, would yield a phase change that is beyond a predetermined range.

9. A system comprising:
   an equalizer having a plurality of stage weights and configured to receive an input signal;
      generate a plurality of sample values from the input signal;
      respectively multiply each sample value of the plurality of sample values by a corresponding stage weight of the plurality of stage weights to yield a plurality of weighted sample values; and
      sum the plurality of weighted sample values to yield an output signal; and
   an adaptation component configured to designate, based on a phase change of the equalizer, which of the plurality of stage weights are to be adjustable;
      determine an adjustment value for each of one or more of the adjustable stage weights, and
      adjust the one or more adjustable stage weights by the respective adjustment values;
   wherein the equalizer is further configured to
      repeat the multiplying and the summing to yield an adjusted output signal.

10. The system of claim 9, wherein the system further comprises a detector configured to generate, from the output signal, a reconstructed signal, and wherein the adjustment values are configured to reduce a difference between the output signal and the reconstructed signal.

11. The system of claim 9, wherein the adjustment values are configured to optimize frequency response of the equalizer.

12. The system of claim 11, wherein the adjustment values are configured to optimize global frequency response of the equalizer at the expense of local frequency response of the equalizer.

13. The system of claim 9, wherein the adaptation component is further configured to calculate the phase change as a function of values of the plurality of stage weights.

14. The system of claim 9, wherein the adaptation component is further configured to:

in response determining that the adjustment values do not satisfy a predetermined condition:
  refrain from adjusting the adjustable stage weights;
  designate different stage weights, of the plurality of stage weights, as adjustable;
  determine respective adjustment values for one or more of the different stage weights; and
  adjust each of the one or more different stage weights by the respective adjustment value.

15. The system of claim 14, wherein adaptation component is configured to determine that the adjustment values do not satisfy the predetermined condition by determining that a number of the stage weights that exceed a predetermined range exceeds a threshold number.

16. The system of claim 14, wherein adaptation component is configured to determine that the adjustment values do not satisfy the predetermined condition by determining that the adjustment values, if applied to the adjustable phase stages, would yield a phase change that is beyond a predetermined range.

17. A non-transitory computer readable medium containing program instructions configured to be executed by a processor to:
  receive an input signal;
  generate a plurality of sample values from the input signal;
  respectively multiply each sample value of the plurality of sample values by a corresponding stage weight, of a plurality of stage weights of an equalizer, to yield a plurality of weighted sample values;
  sum the plurality of weighted sample values to yield an output signal;
  designate, based on a phase change of the equalizer, which of the plurality of stage weights are to be adjustable;
  determine an adjustment value for each of one or more of the adjustable stage weights;
  adjust the one or more adjustable stage weights by the respective adjustment values; and
  repeat the multiplying and the summing to yield an adjusted output signal.

18. The computer readable medium of claim 17, wherein the program instructions are further configured to generate, from the output signal, a reconstructed signal, and wherein the adjustment values are configured to reduce a difference between the output signal and the reconstructed signal.

19. The computer readable medium of claim 18, wherein the adjustment values are configured to optimize frequency response of the equalizer.

20. The computer readable medium of claim 18, wherein the program instructions are further configured to calculate the phase change as a function of values of the plurality of stage weights.

* * * * *